A. G. DAVIS.
RADIUS ROD BRACE.
APPLICATION FILED DEC. 16, 1919.

1,374,829. Patented Apr. 12, 1921.

WITNESS:
F. A. Ackman Jr.

A. G. Davis
INVENTOR.
BY
Victor J. Evans
ATTORNEY.

UNITED STATES PATENT OFFICE.

ALVA G. DAVIS, OF CENTER, KENTUCKY.

RADIUS-ROD BRACE.

1,374,829.  Specification of Letters Patent.  Patented Apr. 12, 1921.

Application filed December 16, 1919. Serial No. 345,264.

*To all whom it may concern:*

Be it known that I, ALVA G. DAVIS, a citizen of the United States, residing at Center, in the county of Metcalfe and State of Kentucky, have invented new and useful Improvements in Radius-Rod Braces, of which the following is a specification.

This invention relates to a brace for the radius rods of automobiles and the principal object of the invention is to strengthen the radius rod and front axle and to facilitate the steering of the automobile.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
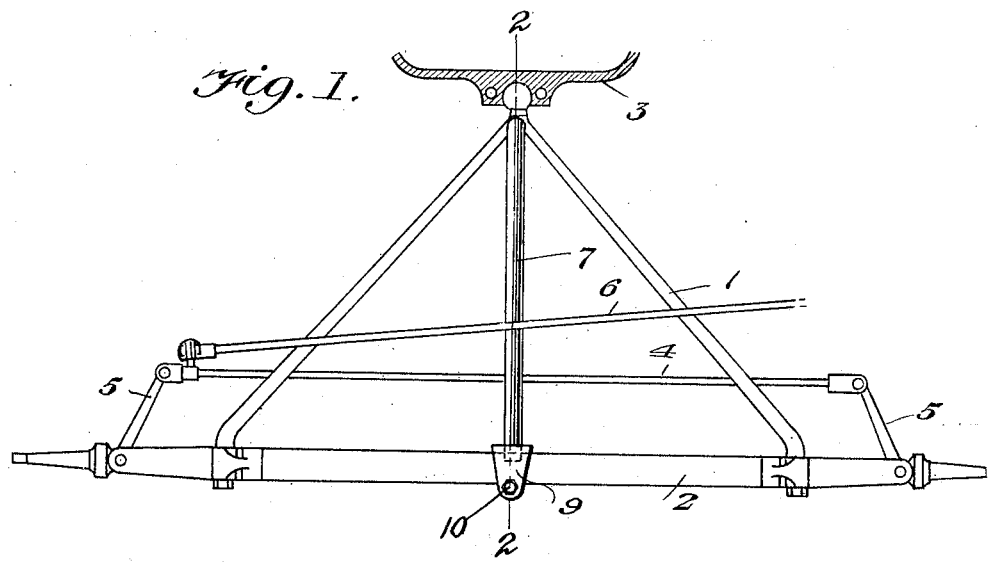
Figure 1 is a diagrammatic plan view showing my invention in use.

In these views 1 indicates the ordinary V-shaped radius rods which extend from the front axle 2 to a part 3 of the crank case. 4 indicates the connecting rod which connects the spindle arms 5 together and 6 indicates the rod which connects said rod 4 with the steering mechanism.

Figure 2:
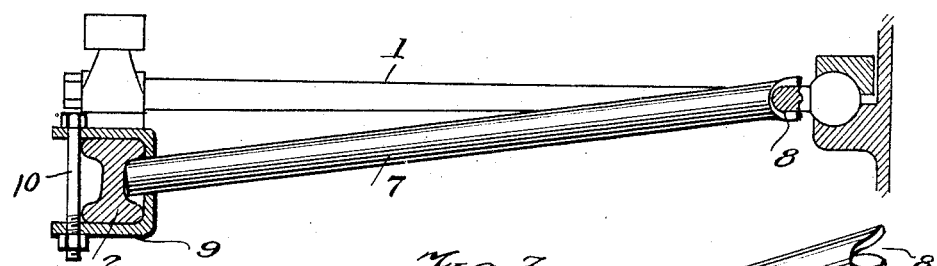
Fig. 2 is a section on line 2—2 of Fig. 1.
Figure 3:
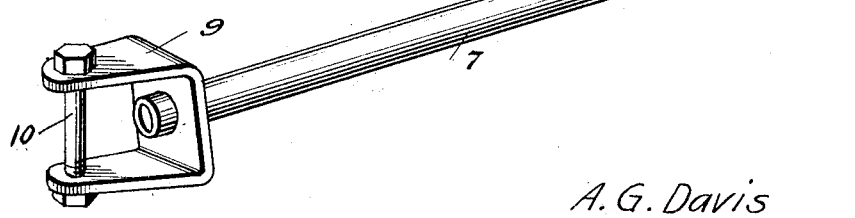
Fig. 3 is a view of the brace alone.

In carrying out my invention I provide a brace 7 which extends from the junction of the two radius rods to the front axle and said rod passes between the connecting rod 4 and the rod 6. The inner end of said brace is forked as at 8 and this fork engages the point of junction of the two radius rods. The outer end of said brace is adapted to engage the inner side of the front axle and to lie between the two flanges thereof, as shown in Fig. 2. A U-shaped bracket 9 has a hole in its cross piece through which the brace passes and this bracket embraces the front axle and is clamped thereto by the bolt 10 which passes through openings formed in the ends of the bracket. In this way the brace is held to the axle.

The brace should be of sufficient length to make a tight fit between the junction of the radius rods and the axle and I prefer to make this brace of a length sufficient to require the brace to be hammered into position. After the brace has been forced into position the bracket is slipped over the axle and secured thereto by the bolt 10.

This brace not only strengthens the front of the automobile but it also facilitates the steering thereof.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a front axle and radius rod of an automobile, a brace rod having a forked end for engaging the radius rod at the junction of its two arms, the other end of said brace rod engaging the web of the front axle, a U-shaped bracket slidably mounted on said brace rod and embracing the axle and a bolt passing through the limbs of the bracket for holding the same in place on the axle.

In testimony whereof I affix my signature.

ALVA G. DAVIS.